United States Patent [19]

Jachmann et al.

[11] Patent Number: 4,908,274
[45] Date of Patent: Mar. 13, 1990

[54] POLYSILOXANES WITH (METH) ACRYLATE ESTER GROUPS LINKED THROUGH SIC GROUPS AND THEIR USE AS RADIATION-CURABLE COATING MATERIALS FOR FLAT CARRIERS

[75] Inventors: Jürgen Jachmann, Herne; Christian Weitemeyer, Essen; Dietmar Wewers, Bottrop, all of Fed. Rep. of Germany

[73] Assignee: Th. Goldschmidt AG

[21] Appl. No.: 150,773

[22] Filed: Feb. 1, 1988

[30] Foreign Application Priority Data

Feb. 6, 1987 [DE] Fed. Rep. of Germany ....... 3703648

[51] Int. Cl.$^4$ .......................... B32B 9/06; C08G 77/04
[52] U.S. Cl. ...................... 428/452; 522/99; 528/26; 528/32; 556/437; 556/440
[58] Field of Search ...... 522/99, 26; 528/32; 556/440, 437; 428/452

[56] References Cited

U.S. PATENT DOCUMENTS

| | | | |
|---|---|---|---|
| 4,293,678 | 10/1981 | Carter et al. | 528/32 |
| 4,301,268 | 11/1981 | Kropac | 528/26 |
| 4,306,050 | 12/1981 | Koerner et al. | 528/26 |
| 4,640,967 | 2/1987 | Eckberg | 528/26 |
| 4,678,846 | 7/1987 | Weitemeyer et al. | 525/477 |
| 4,777,233 | 10/1988 | Suzuki et al. | 528/32 |

OTHER PUBLICATIONS

*Handbook of Epoxy Resins,* New York, McGraw-Hill Book Company 1967 pp. 5–32, Lee et al.

*Primary Examiner*—John C. Bleutge
*Assistant Examiner*—R. Dean, Jr.
*Attorney, Agent, or Firm*—Toren, McGeady & Associates

[57] ABSTRACT

Polysiloxanes with (meth)acrylate ester groups linked over SiC groups are disclosed which are obtainable by the reaction of epoxy-functional polysiloxanes of the general formula

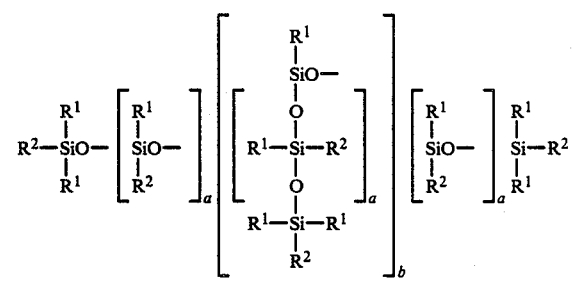

in which $R^1$ are the same or different low molecular alkyl groups with 1 to 4 carbon atoms or phenyl groups,
$R^2$ is the same as $R^1$ or presents the $R^3$ group 70 to 100% of the $R^3$ groups being epoxy functional groups and 30 to 0% being alkyl groups with 2 to 20 carbon atoms or hydrogen, with the proviso that the average molecule contains at least 1.5 epoxy groups,
a has a value of 1 to 1,000 and
b a value of 0 to 10;
with such amounts of an acid mixture, comprising
  (a) 10 to 90 mole percent of (meth)acrylic anhydride and
  (b) 90 to 10 mole percent of (meth)acrylic acid,
that the sum of (a) and (b) adds up to 100 mole percent, and that there are present 0.8 to 1.9n and preferably 1.1 to 1.9n acid equivalents per n epoxide equivalents.

The polysiloxanes are useful as radiation-curable adhesive coating materials for flat backings. The siloxanes adhere well to the backing that is to be coated and cured at a high rate, the coating having a good chemical and physical resistance and a high flexibility. The adhesive coating can be matched to the chemical character of the adhesive and adjusted to the desired degree of abhesiveness.

16 Claims, No Drawings

POLYSILOXANES WITH (METH) ACRYLATE ESTER GROUPS LINKED THROUGH SIC GROUPS AND THEIR USE AS RADIATION-CURABLE COATING MATERIALS FOR FLAT CARRIERS

CROSS REFERENCE TO RELATED DISCLOSURE

This invention corresponds to Disclosure document 161403 deposited in the Patent and Trademark Office on Dec. 30, 1986.

FIELD OF THE INVENTION

The present invention relates to new polysiloxanes with (meth)acrylate ester groups linked through SiC groups. Considered from another aspect, the invention is concerned with radiation-curable abhesive coating compositions containing the new (meth)acrylate ester modified polysiloxanes as active ingredient and coatings on carrier material obtained therefrom.

For the purpose of this invention, including the claims, the term "(meth)acrylate ester" is deemed to mean acrylate esters as well as methacrylate esters, the term "(meth)acrylate" being employed for the sake of simplicity.

BACKGROUND INFORMATION AND PRIOR ART

Abhesive coating compositions are used on a large scale for coating the surfaces of a variety of materials, especially flat or plane materials, to reduce the adhesive tendency of adhering products towards these surfaces. Abhesive coating compositions are used, for example, to coat papers or films which are to be used as backing or carrier for pressure-sensitive labels. Labels, which are provided with a pressure-sensitive adhesive, still adheres to the coated surface to a sufficient extent to enable the backing films with the adhesive labels thereon to be handled. However, it is a prerequisite to be able to peel off the labels from the coated backing film without significantly reducing their adhesive force for later use. Further applications for abhesive coating compositions are packing or wrapping papers which are used to wrap sticky materials in particular. Such abhesive papers or films are used, for example, to package or wrap foods or industrial products, such as bitumen.

Cross-linkable organopolysiloxanes, especially radiation-curable organopolysiloxanes which are modified with acrylate ester groups have proven to be suitable as abhesive coating compositions.

For example, a method for preparing organopolysiloxanes, modified with pentaerythritol triacrylate or pentaerythritol methacrylate esters, from organochloropolysiloxanes, optionally with HCl-binding neutralizing agents, is known from German Patent No. 29 48 708. For this method, organopolysiloxanes of the formula

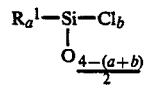

($R^1$=alkyl with 1 to 4 carbon atoms, vinyl and/or phenyl, with the proviso that at least 90 mole percent of the $R^1$ groups are methyl; a=1.8 to 2.2; b-0.004 to 0.5) are first reacted with, based on the SiCl groups, at least 2 moles of a dialkylamine. The alkyl groups of this dialkylamine each have 3 to 5 carbon atoms and the carbon atoms, adjacent to the nitrogen, carry no more than one hydrogen atom. The reaction product is then allowed to react with at least equimolar amounts of pentaerythritol acrylate or methacrylate and finally separated from the solid components suspended in it by a known method.

A coating composition prepared according to this method shows relatively good abhesive properties. Adhesive tape, in contact with the coating composition, largely retains its adhesive force relative to untreated substrates. However, it has been ascertained that the property of abhesiveness must be considered in conjunction with the chemical composition and structure of the adhesive, relative to which the coating material is to have abhesive properties. The coating material described in German Patent No. 29 48 708 therefore cannot provide satisfactory results in all cases, since its properties cannot be matched to different adhesives.

Improved properties were exhibited by (meth)acrylate ester-modified organopolysiloxane mixtures which are characterized in that they consist of an equilibrated organopolysiloxane with, on average, >25 to <200 silicon atoms, 2 to 30% by weight or organopolysiloxanes with, on average, 2 to 25 silicon atoms and 2 to 30% by weight of organopolysiloxanes with, on average, 200 to 2,000 silicon atoms. Such compounds are disclosed in German Patent No. 34 26 087. Different tasks are assigned to the organopolysiloxanes contained in this ternary mixture. The low molecular weight fraction essentially must fulfill the task of ensuring the adhesion of the coating composition to the substrate. The high molecular weight fraction serves primarilly the purpose of achieving the desired abhesiveness of the coating composition. The middle fraction is the curable matrix which is responsible especially for the physical properties of the coating composition. Those skilled in the art will understand that this is merely a simplified description of the properties and tasks of the three different fractions since the complex properties which an abhesive coating material must have can be obtained only by the cooperation of the three components. It has become possible with the modified organopolysiloxane mixture of German Patent 34 26 087 to improve, on the one hand, the abhesive properties of the mixture relative to adhesive surfaces and, on the other, the adhesive properties relative to the substrate on which the coating material is applied and on which it is cured. However, it has been ascertained that the properties of even these coating compositions cannot be adapted adequately to different adhesives.

In European Offenlegungsschrift 0 159 683, electron beam-curable liquid coating materials are described. These contain the following:

1. 60 to 95 parts of an organopolysiloxane with more than about 25 siloxane groups per molecule and 2 to 10 parts of reacted carbinol groups per molecule, the remaining substituents on the silicon being hydrocarbon groups with 1 to 20 carbon atoms; reacted carbinol groups in this context are understood to be esters of acrylic acid, methacrylic acid or mixtures or ethers of a hydroxyalkyl ester of these acids, the alkyl group containing 2 to 4 carbon atoms; unreacted carbinol groups are essentially no longer to be present so that the hydroxyl number is less than 10;

2. 3 to 25 parts of a polyester of a polyhydric alcohol with acrylic acid, methacrylic acid or mixtures of these acids, the polyhydric alcohol having 2 to 4 hydroxyl groups per molecule and a molecular weight of less than 1,200;

3. 1 to 10 parts of acrylic acid, methacrylic acid or mixtures of these acids.

The additional use of the (meth)acrylate ester of a polyalcohol increases the curing rate; however, as a result of the increase in the organic portion, it has a very disadvantageous effect on the flexibility and abhesiveness of the coating material. The content of free acrylic acid or methacrylic acid is a further disadvantage, as it leads to an objectionable odor and makes the processing more difficult when applying the product on the material to be coated.

Because they can be cured by radiation, organopolysiloxanes with acrylate ester groups have been described for a number of additional applications. Organopolysiloxanes, modified with acrylate ester groups, are thus used as coating lacquers for casting or recasting electric and electronic components as well as for producing molded objects. The following Offenlegungsschriften, Auslegeschriften and patents are referred to for possible structures of such polysiloxanes which are modified with acrylate ester groups.

German Auslegeschrift 23 35 118 relates to optionally substituted acrylate group-containing organopolysiloxanes of the general formula

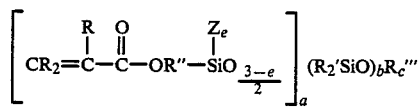

(R is hydrogen or a monovalent hydrocarbon group with 1 to 12 carbon atoms; R' are monovalent, optionally halogenated hydrocarbon groups or cyanoalkyl groups with 1 to 8 carbon atoms; R" are divalent hydrocarbon groups with 1 to 18 carbon atoms or divalent hydrocarbon groups with C—O—C bonds; R'''=R''''$O_{0.5}$ or $R_3'SiO_{0.5}$; Z=OR'''', R'''' or $OSiR_3'$; R'''' is an alkyl group with 1 to 12 carbon atoms; a and b each are numbers from 1 to 20,000; c is a number from 0 to 3; e is a number from 0 to 2; at least one of the Z groups is OR'''' when c=0.) The siloxane polymers can be used as intermediates in the synthesis of copolymers, which contain organopolysiloxane segments and find application as coating compositions. Moreover, these acrylate-functional siloxane polymers can serve as sizing materials and as protective coating compositions for paper and fabrics. These products, however, are unsuitable for the preparation of abhesive coating materials. The linear diacrylate-modified polysiloxanes of the German Auslegeschrift 23 35 118, moreover, have groups which are defined as alkoxy groups and which can be split off hydrolytically and lead to further crosslinking of the polysiloxanes with deterioration of the elastic properties that are important for a coating composition.

From German Offenlegungsschrift 30 44 237, polysiloxanes with lateral acrylate ester groups are known which can be synthesized by reacting epoxy-functional siloxanes of a particular structure with acrylic acid. The products obtained are radiation-curable. They can be used as low viscosity lacquers for application by way of printing inks based on oil. The products can be used only with major limitations as abhesive coating composition, since each acrylate ester group is facing a hydroxyl group.

In U.S. Pat. No. 4,568,566, curable silicone preparations are described which comprise (a) 75 to 100 mole percent of chemically bound siloxy units of the formula $R_3SiO_{0.5}$, $RSiO_{1.5}$ and $SiO_2$ and (b) 0 to 25 mole percent of $R_2SiO$ units, a number of the R units having the formula

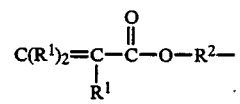

$R^1$ being hydrogen or a hydrocarbon group with 1 to 12 carbon atoms and $R^2$ a divalent hydrocarbon group or an oxyalkylene group. These curable preparations are used especially to coat electronic components and as coating materials for optical fibers. They are not suitable as abhesive coating materials for flat backings because the content of $R_2SiO$ units is too low.

The object of European Offenlegungsschrift 0 152 179 is a silicone preparation which can be cured to form an elastomer. It comprises (a) a silicone resin with linear construction, and on the average, at least 150 siloxane units, as well as terminal acrylic acid groups, the region in between being free of acrylic acid groups, (b) at least 10% of finely divided silica and (c) a photoinitiator. These materials are to be used as adhesives and casting compounds.

Finally, reference is made to European Offenlegungsschrift 0 169 592. This Offenlegungsschrift relates to an optical glass fiber with a plastic coating, with a glass fiber and an enveloping layer of a synthetic rubber with a refractive index which is larger than that of the outer layer of the glass fiber. The synthetic rubber is formed from a curable plastic composition which has a copolymer, the monomer units of which comprise dimethylsiloxane and at least one siloxane of the group formed by methylphenylsiloxane and diphenylsiloxane. The siloxane copolymer has at least two acrylate ester groups per molecule, with the distinguishing feature that the curable plastic composition, moreover, has a polyurethane acrylate with an average molecular weight of more than 3,000. The polysiloxane named in the claim may have the following formula:

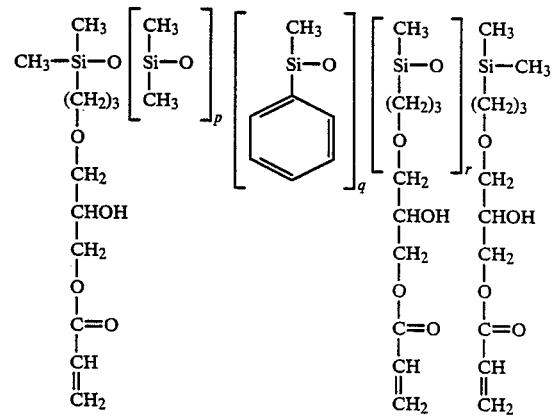

It is an essential condition that these polysiloxanes have phenyl groups which are linked to silicon. The phenyl group content is necessary for matching the refractive index of the coating composition to that of the glass of the optical fiber. It is not possible to draw a conclusion from the use of these siloxanes in combination with a polyurethane acrylate for coating optical glass fibers with regard to the possible usefulness of such compounds as abhesive coating compositions.

In the journal, "Makromolekulare Chemie" (Rapid Communication), 7, (1986), 703 to 707, the synthesis of linear methylpolysiloxanes with terminal methacrylate ester groups is described. For this synthesis, an addition reaction between an α,ω-hydrogendimethylsiloxane and allyl epoxypropyl ether is carried out first in the presence of chloroplatinic acid. The diepoxide formed is subsequently reacted with methacrylic acid in the presence of chromium diisopropyl salicylate to the desired methacrylate esters. These esters may be present in two isomeric forms:

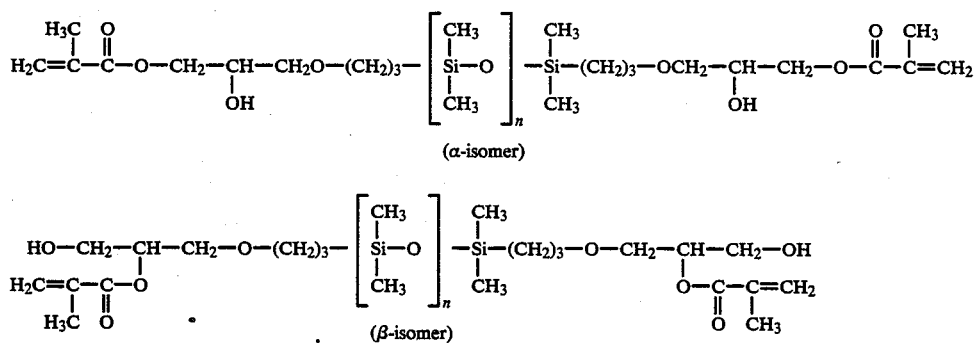

(α-isomer)

(β-isomer)

Insofar as (meth)acrylate esters are synthesized by the method of the state of the art starting out from epoxy-functional siloxanes, the epoxy groups are reacted with (meth)acrylic acid. In this reaction, monoesters of (meth)acrylic acid with a vicinal hydroxyl group are formed through opening of the epoxide ring.

OBJECTS OF THE INVENTION

It is a primary object of the invention to provide novel (meth)acrylate ester-modified organopolysiloxanes which exhibit superior abhesive properties and which are particularly suitable for use in abhesive coating compositions having improved properties compared to the coating compositions known from the state of the art.

It is also an object of the invention to provide novel compounds and coating compositions which can be adapted to different adhering products (adhesives).

The inventive organopolysiloxanes modified with (meth)acrylate ester groups should have the following combination of properties:

1. a satisfactory adhesion to the particular backing or carrier to be coated
2. a high curing rate on the backing
3. chemical and physical stability of the cured coating
4. a high flexibility of the cured coating
5. abhesive properties relative to sticky products, adaptability of the abhesive coating to the chemical characteristics of the adhesive
6. adjustability of the desired degree of abhesiveness.

SUMMARY OF THE INVENTION

This combination of properties is to be found in polysiloxanes which have (meth)acrylate ester groups that are linked by way of SiC bonds and which are obtainable by the reaction of epoxy-functional polysiloxanes of the general formula

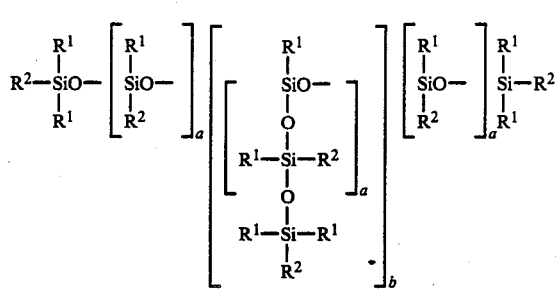

wherein
$R^1$ are the same or different low molecular weight alkyl groups with 1 to 4 carbon atoms or phenyl groups,
$R^2$ is the same as $R^1$ or represents the $R^3$ group 70 to 100% of the $R^3$ groups being epoxy functional groups and 30 to 0% being alkyl groups with 2 to 20 carbon atoms or hydrogen, with the proviso that the average molecule contains at least 1.5 epoxy groups,
a has a value of 1 to 1,000 and
b a value of 0 to 10,
with such amounts of an acid mixture, consisting of
(a) 10 to 90 mole percent of (meth)acrylic anhydride and
(b) 90 to 10 mole percent of (meth)acrylic acid,
that the sum of (a)+(b) adds up to 100 mole percent and that there are present 0.8 to 1.9n, and preferably 1.1 to 1.9n, acid equivalents per n epoxide equivalents. The reaction is carried out at elevated temperatures, if necessary, in the presence of solvents and the usual esterification catalysts.

The reaction of epoxy-functional modified siloxanes with an acid mixture of (meth)acrylic anhydride and (meth)acrylic acid results in the formation of (meth)acrylate esters according to the following reaction scheme:

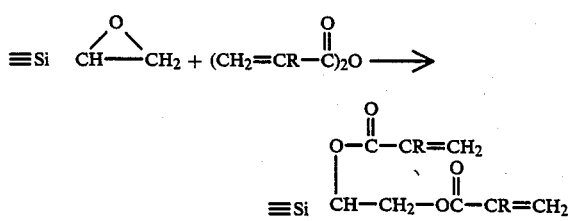

-continued

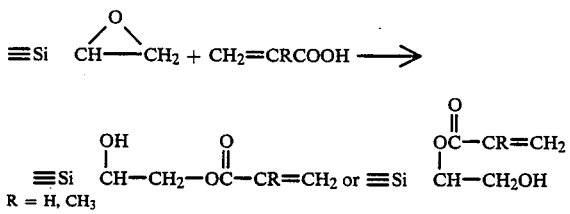

The organopolysiloxanes modified pursuant to the invention have, depending on the composition of the mixture comprising (meth)acrylic anhydride and (meth)acrylic acid and on the amount of the mixture used (relative to the epoxide groups), predeterminable amounts of (meth)acrylate diester groups, (meth)acrylate monoester groups, hydroxyl groups and, optionally, unreacted epoxide groups. Since it has turned out that the abhesiveness increases with the number of (meth)acrylate ester groups but that compatibility with the substrate improves as the content of hydroxyl and possibly of expoxide groups increases, it is easily possible to bring these opposite properties into a balanced relationship, as required by the application.

The cross-linking density of the cured siloxanes moreover can be influenced by the ratio of monoester groups to diester groups. Differences in the cross-linking density result in different physical properties, such as an increase in the hardness and in the mechanical resistance when the cross-linking density is increased or a lowering of the glass transition temperature and an increase in the elastic properties when the cross-linking density is decreased.

Of particular importance for the definition of the compounds of the invention, therefore, is the data concerning the composition of the mixture of (meth)acrylic anhydride and (meth)acrylic acid and the amount of this mixture which is required to synthesize the compounds of the invention, in relation to the epoxide groups.

The composition of the mixture may vary within the following limits:

| (meth)acrylic anhydride | 10 mole percent | to | 90 mole percent |
|---|---|---|---|
| (meth)acrylic acid | 90 mole percent | to | 10 mole percent |
| | 100 mole percent | | 100 mole percent |

The sum must always be 100 mole percent.

Since (meth)acrylic anhydride provides 2 acid groups and (meth)acrylic acid 1 acid group, the mixture of
10 mole percent of (meth)acrylic anhydride and
90 mole percent of (meth)acrylic acid (Mixture a)
contains 1.1 acid groups per 100 mole percent, while the mixture of
90 mole percent of (meth)acrylic anhydride and
10 mole percent of (meth)acrylic acid (Mixture b)
contains 1.9 acid groups per 100 mole percent.

The amount of the mixture to be used arises out of the second characteristic feature, according to which there should be 0.8 to 1.9n acid equivalents for every n epoxide equivalents. If, for example, 1.5 acid equivalents are to be used per epoxide group, 1.36 moles of Mixture a and 0.79 moles of Mixture b must be used. It can be seen that the two characteristic features readily make it possible for those skilled in the art to adjust the diester, monoester, hydroxyl and, if necessary, the residual epoxide content of the polysiloxane in the desired manner.

A further possibility of influencing the abhesive properties is provided by the fact that up to 30% of the $R^3$ groups may be alkyl groups with 2 to 10 carbon atoms, wherein the alkyl groups may be optionally substituted. The organic character of the modified polysiloxanes is increased due to the presence of the alkyl groups with 2 to 10 carbon atoms. In this connection, it can generally be assumed that the abhesive properties of the polysiloxane can be selectively reduced by increasing the content of the alkyl groups as well as by increasing the length of the chain of the alkyl groups. Examples of suitable, optionally substituted alkyl groups are ethyl, propyl, n-butyl, i-butyl, hexyl, octyl, dodecyl, octadecyl, 2-phenylpropyl and 3-chloropropyl groups. Alkyl groups with 2 to 10 carbon atoms are especially preferred.

The $R^1$ groups are identical or different lower molecular weight alkyl groups with 1 to 4 carbon atoms or phenyl groups. Preferably, at least 90% of the $R^1$ groups are methyl groups.

Pursuant to the invention, epoxy-functional groups are understood to be groups which are linked to the siloxane framework over an SiC bond and have an epoxy group. Preferred examples of epoxy-functional $R^3$ groups are the following:

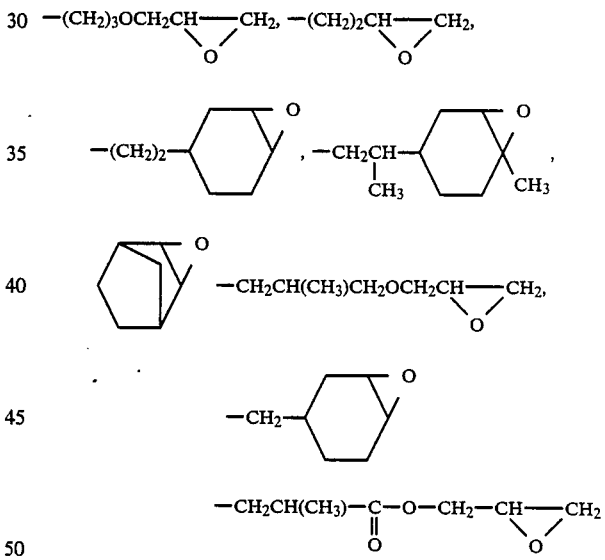

In the epoxy-functional polysiloxanes of Formula I, $R^3$ groups may be contained which represent hydrogen. These hydrogens originate from the hydrogenpolysiloxanes used as starting compounds for the synthesis of the epoxy-functional polysiloxane. However, alkyl groups with 2 to 20 carbon atoms or hydrogens should not constitute more than 30% of the $R^3$ groups.

The chain length and the degree of branching of the polysiloxanes are determined by the values of a and b; a has a value of 1 to 1,000 and b a value of 0 to 10. Especially preferred are polysiloxanes in which a has a value of 5 to 200 and b a value of 0 to 2. Unbranched products, that is, products in which b has a value of 0, are particularly preferred.

Examples of inventive polysiloxanes with (meth)acrylate ester groups linked over SiC groups are Compound 1

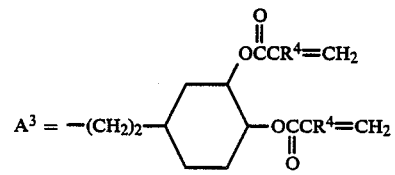

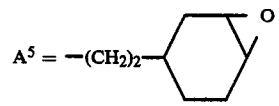

$A^1 = -(CH_2)_3OCH_2CHCH_2O\overset{O}{\underset{|}{C}}CR^4=CH_2$
$\phantom{A^1 = -(CH_2)_3OCH_2CHCH_2}\underset{O}{\overset{|}{OCCR^4=CH_2}}$ $A^2 = -(CH_2)_3OCH_2CHCH_2O\overset{O}{C}CR^4=CH_2$ or
$\phantom{A^2 = -(CH_2)_3OCH_2CHCH_2}\underset{OH}{|}$ $-(CH_2)_3OCH_2CHCH_2OH$
$\phantom{-(CH_2)_3OCH_2}\underset{O}{\overset{|}{OCCR^4=CH_2}}$ in which
 m=0.8
 n=0.2 and
 R⁴=H or CH₃;

Compound 2

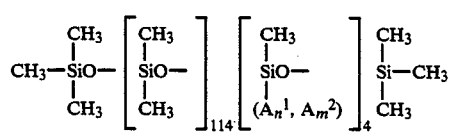

in which A¹, A², n and m are defined as for Compound 1;

Compound 3

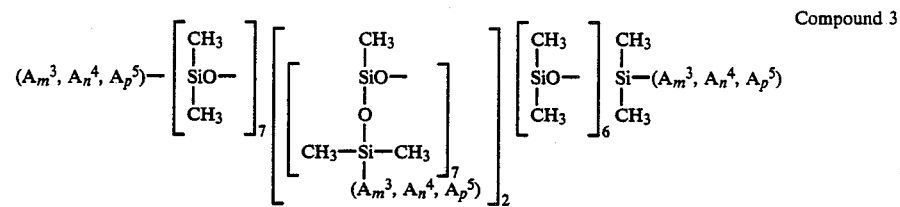

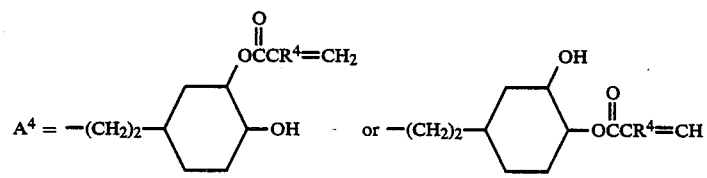

$A^4 = -(CH_2)_2\text{-cyclohexyl}$ with OCCR⁴=CH₂ and OH   or   $-(CH_2)_2\text{-cyclohexyl}$ with OH and OCCR⁴=CH

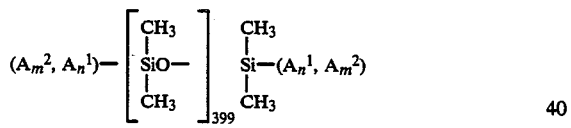

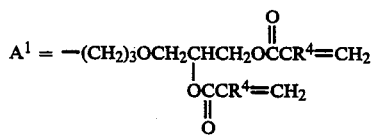

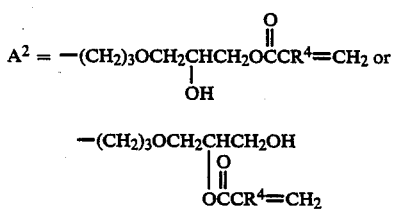

in which
 m=0.4
 n=0.5
 p=0.1 and
 R⁴=H or CH₃;

Compound 4

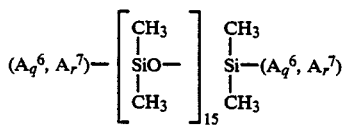

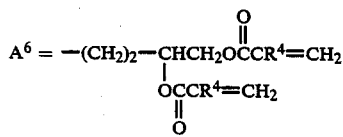

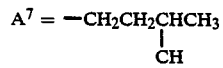

in which
 q=0.9
 r=0.1 and
 R⁴=H or CH₃;

Compound 5

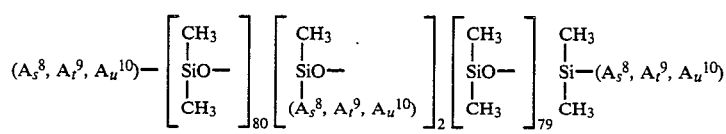

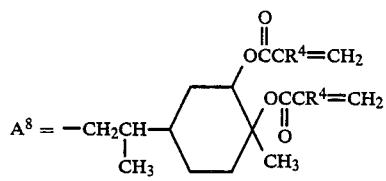

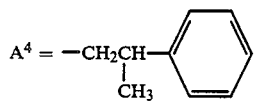

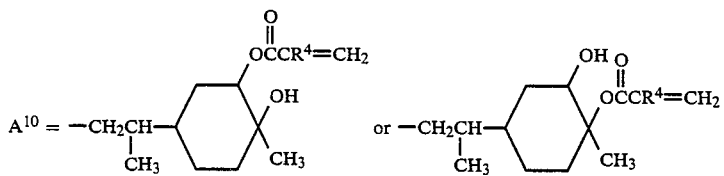

in which
s=0.6
t=0.3
u=0.1 and
$R^4$=H or $CH_3$;

Compound 6

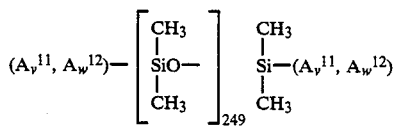

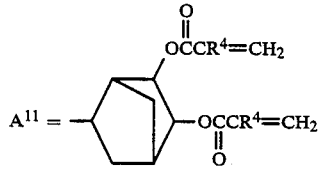

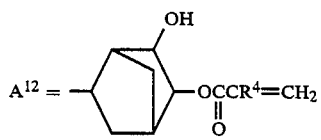

in which
v=0.6
w=0.4 and
$R^4$=H or $CH_3$.

The polysiloxanes of the invention can be synthesized by methods known from the state of the art, starting out from polysiloxanes of Formula I, in which $R^2$ is hydrogen. The reaction of the hydrogensiloxanes with epoxides which have an olefinic bond capable of entering into an addition reaction with SiH, is described, for example, as stated above, in the journal "Makromolekulare Chemie" (Rapid Communication), 7, (1986), 703 to 707. For the case in which up to 30% of the $R^3$ groups are alkyl groups with 2 to 20 carbon atoms, the addition reaction with the olefinic hydrocarbons with 2 to 20 carbon atoms can be carried out together with that of the epoxides or it may be carried out in a separate step of the process.

The starting compounds of Formula I, so obtained, are now reacted with the mixture of (meth)acrylic anhydride and (meth)acrylic acid in the given quantitative ratios in the presence of solvents, such as toluene, at elevated temperatures, especially at temperatures from 80° to 150° C., to the corresponding esters.

The formation of the esters can be accelerated by the usual, preferably basic catalysts, such as alkaline earth oxides, amines or metal salts. Acidic catalysts are less suitable because of possible ring-opening side reactions of the epoxide groups. Because the formation of the esters take place according to the general rules known for this reaction, reference can be made to the usual organic synthesis reference books.

A further aspect of the invention is the use of the polysiloxanes of the invention as radiation-curable abhesive coating materials for flat backings. The inventive products of the reaction can be used directly as such. Only in the case of UV curing is it necessary to add a radical starter to the modified polysiloxanes. The starter is added in amounts of 2 to 5% by weight based on the siloxane.

The selection of the radical starter should be guided by the wavelength spectrum of the radiation source used for the curing. Such radical starters are known. Examples of such radical starters are benzophenone, its oximes or benzoin ether.

It is possible to modify the coating compositions so obtained by known methods through the addition of other products. Such known modifying agents are siloxanes with groups which are incorporated chemically into the coating composition while it is being cured. Especially suitable modifying agents are siloxanes with hydrogen atoms linked to silicon atoms. These can produce such effects as a lowering of the viscosity of the coating composition, as a result of which their applicability on flat backings is improved.

It is furthermore possible to add additives to the coating materials. These additives, as inert substances, are enclosed by the coating composition during the curing reaction. Examples of such substances, dispersed in the coating composition, are highly dispersed silica or polymers of fluorinated hydrocarbons.

The synthesis of polysiloxanes, modified with (meth)acrylate ester groups pursuant to the invention, as well as their application properties are described in the following examples, it being understood that these examples are given by way of illustration and not by way of limitation.

EXAMPLE 1

To 248 g (2 moles) of vinylcyclohexene oxide and 40 mL of a solution of 4 mg of $H_2PtCl_6 \cdot 6H_2O$ in 3 mL of glycol dimethyl ether in a 4 L 3-neck flask, 1,170 g (1 mole) of an SiH group-containing polydimethylsiloxane of average formula

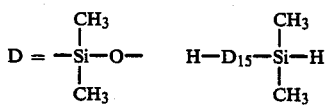

are added dropwise at 90° C. After 7 hours at 100° C., 500 g of toluene, 8 g of 1,4-diazabicyclo(2,2,2)octane and 0.2 g of hydroquinone were added to the so obtained epoxy-functional polydimethylsiloxane of the average formula

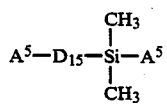

in which $A^5$ is as defined for Compound 3. Subsequently, a mixture of 130 g (1.8 moles) of acrylic acid and 12.6 g (0.2 moles of acrylic anhydride is added dropwise, so that a temperature of 120° C. is not exceeded. After 30 hours at 100° C., distillation (100° C., 60 torr) and filtration, 1440 g (93% of the theoretical yield) of a reddish brown oil of medium viscosity are obtained. According to the $^1$H NMR spectrum, the oil has the general structure

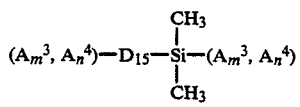

in which
$A^3$ and $A^4$ are defined as in Compound 3 ($R^4=H$),
m=0.1,
n=0.9.

EXAMPLE 2

(not of the invention)

As in Example 1, 22.8 g (0.2 moles) of allyl glycidyl ether and 368.6 g (0.1 moles) of an SiH group-containing polydimethylsiloxane having the average formula

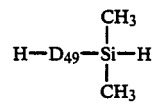

are reacted to form an epoxy-functional polydimethylsiloxane having the average formula

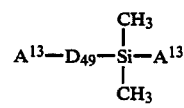

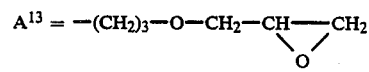

If the product obtained is reacted as in Example 1 with 17.3 g (0.24 moles) of acrylic acid, 365 g (90% of the theoretical yield) of a reddish brown oil which according to the $^1$H-NMR spectrum has the average formula

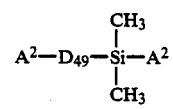

in which $A^2$ is as defined in Compound 2 ($R^4=H$), is obtained after 40 hours at 100° C. and working up as described in Example 1.

EXAMPLE 3

To a 500 mL 3-neck flask are added 100 g (27 mmoles) of the epoxy-functional polysiloxane of the general formula

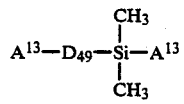

which was synthesized in Example 2 and in which $A^{13}$ is as defined in Example 2, 6.1 g (48.6 mmoles) of acrylic anhydride and 0.4 g (5.4 mmoles) of acrylic acid, 1.0 g of diazabicyclo(2,2,2)octane and 0.05 g of hydroquinone and the mixture is heated to 100° C. After 20 hours at this temperature and filtration 98.4 g (92% of the theoretical yield) of an acrylate-functional polydimethylsiloxane of the average formula

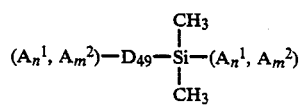

are obtained, in which
$A^1$, $A^2$ are defined as in Compound 2 ($R^4=H$).
n=0.9,
m=0.1.

EXAMPLE 4

As in Example 3, 100 g (27 mmoles) of the epoxy-functional polydimethylsiloxane

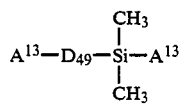

in which $A^{13}$ is defined as in Example 2, are reacted with a mixture of 3.4 g (27 mmoles) of acrylic anhydride and 2.0 g (27 mmoles) of acrylic acid. After 25 hours at 100° C. followed by filtration, 94.8 g (90% of the theoretical yield) of an acrylate-functional polydimethylsiloxane of the average formula

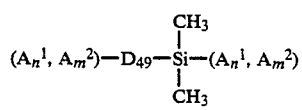

are obtained, in which
$A^1$ and $A^2$ are defined as in Compound 2 ($R^4=H$),
$n=0.5$
$m=0.5$.

EXAMPLE 5

As in Example 1, 20.5 g (180 mmoles) of allyl glycidyl ether, 2.4 g (20 mmoles) of α-methylstyrene and 368.6 g (100 mmoles) of an SiH group-containing polydimethylsiloxane of the average formula

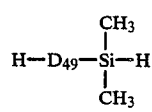

are reacted to form a polydimethylsiloxane of the average formula $$(A_q{}^{15}, A_p{}^{14}, A_m{}^{10}, A_n{}^8)-D_{49}-\underset{\underset{CH_3}{|}}{\overset{\overset{CH_3}{|}}{Si}}-(A_p{}^9, A_q{}^{13})$$

in which
$A^9$ is defined as in Compound 5,
$A^{13}$ is defined as in Example 2,
$q=0.9$
$p=0.1$ Subsequently, the polydimethylsiloxane obtained is reacted as in Example 3 with 2.1 g (162 mmoles) of acrylic anhydride and 0.13 g (18 mmoles) of acrylic acid. After 20 hours at 100° C., 1110 g (3.75 moles) of octamethylcyclotetrasiloxane and 7.5 g of concentrated sulfuric acid are added to the reaction mixture and equilibrated at 100° C. No viscosity increase is measurable after 10 hours. The reaction mixture is neutralized with 75 g of Na₂CO₃. A highly viscous oil of the average formula $$(A_n{}^1, A_m{}^2, A_p{}^9)-D_{199}-\underset{\underset{CH_3}{|}}{\overset{\overset{CH_3}{|}}{Si}}-(A_p{}^9, A_m{}^2, A_n{}^1)$$

is obtained, in which
$A^1$ and $A^2$ are defined as in Compound 1 ($R^4=H$)
$n=0.81$
$m=0.1$,
$p=0.09$.
The yield of 1218 g corresponds to 81% of the theoretical.

EXAMPLE 6

As in Example 1, 200 g (100 mmoles) of an SiH group-containing polydimethylsiloxane of the average formula

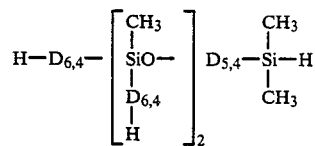

are added dropwise to a mixture of 54.7 g (360 mmoles) of limonene oxide, 3.4 g (40 mmoles) of 1-hexene and 8 mL of catalyst solution. After 7 hours at 100° C., 100 g of toluene, 1.6 g of 1,4-diazbicyclo(2,2,2)octane and 0.04 g of hydroquinone are added to the reaction mixture. Subsequently, a mixture of 17.3 g (240 mmoles) of acrylic acid and 10.0 g (80 mmoles) of acrylic anhydride are added dropwise at 100° C. After 30 hours and a similar working-up procedure, 239 g (85% of the theoretical yield) of an oil are obtained, which has the average formula

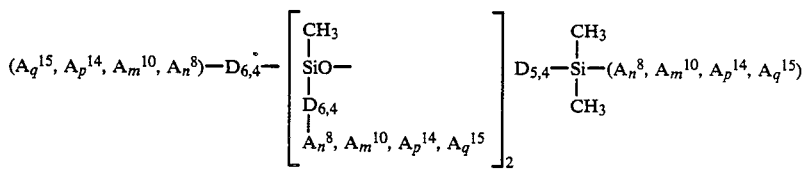

in which
$A^8$ and $A^{10}$ are defined as in Compound 5 ($R^4=H$),
$A^{14}=-(CH_2)_5-CH_3$,

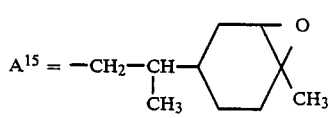

$n=0.2$,
$m=0.6$,
$p=0.1$ and
$q=0.1$

EXAMPLE 7.

As in Example 2, 22.8 g (0.2 moles) of allyl glycidyl ether and 441.9 g (0.05 moles) of an SiH group-containing polydimethylsiloxane of the average formula

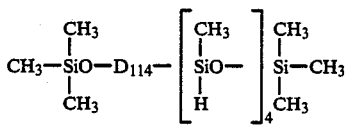

are reacted to form an epoxy-functional polydimethylsiloxane of the average formula

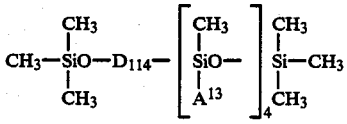

in which $A^{13}$ is defined as in Example 2.

Subsequently, the polydimethylsiloxane obtained is reacted with 20.2 g (0.16 moles) of acrylic anhydride and 2.9 g (0.04 moles) of acrylic acid. After 20 hours at 100° C., the product is filtered and 450.2 g (96.9% of the theoretical yield) of a medium viscosity oil of the average formula

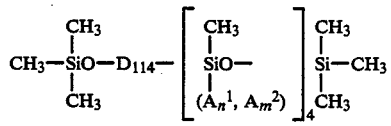

are obtained, in which
$A^1$ and $A^2$ are defined as in Compound 1 ($R^4$=H)
n=0.8,
n=0.2.

TESTING THE APPLICATION

To test the application properties, the novel polydimethyl polysiloxanes of Examples 1, 3, 4, 5, 6 and 7 containing acrylate ester groups listed over SiC groups are applied on different flat backings (OPP film, glazed paper) and subsequently cured at 1.5 Mrad with an electron beam. The amount applied is about 1.1 g/m². Two acrylate adhesives (Tesa 154 and Tesa 970) and one rubber adhesive (Tesa 758) are used as test adhesives. To measure the adhesiveness, 30 mm wide adhesive tapes are rolled on and subsequently stored at 70° C. After 24 hours, the force is measured, which is required to pull the adhesive tape off from the substrate at a peel angle of 180°. This force is referred to as the release force. In addition, the adhesion to the substrate is tested by rubbing vigorously with the thumb. Rubbery crumbs are formed if the adhesion is defective (so-called ruboff test).

TABLE

| Modified Siloxane Example | Release Force [N] | | | | | | | |
|---|---|---|---|---|---|---|---|---|
| | Paper | | | | OPP Film | | | |
| | Tesa | | | rub | Tesa | | | rub |
| | 154 | 970 | 758 | off | 154 | 970 | 758 | off |
| 1 | 7 | 10 | 9 | no | 6 | 10 | 9 | no |
| 2* | 0 | 0 | 0 | — | 0 | 0 | 0 | — |
| 3 | 0.5 | 1.5 | 1.4 | no | 0.2 | 1.1 | 1.0 | no |
| 4 | 1.8 | 2.8 | 2.5 | no | 1.5 | 2.5 | 2.2 | no |
| 5 | 0.1 | 0.15 | 0.15 | no | 0.1 | 0.15 | 0.15 | no |
| 6 | 6 | 8 | 8 | no | 5 | 8 | 9 | no |
| 7 | 1 | 2 | 1.6 | no | 0.6 | 1.7 | 1.3 | no |

*not of the invention, not cured

It is evident from the Table that, by selecting the (meth)acrylate ester-modified organopolysiloxanes, coating compositions are obtained which have the desired profile of properties provided that the organopolysiloxanes have the structure described in the present invention.

What is claimed is:

1. Polysiloxanes with (meth)acrylate ester groups linked over SiC groups, obtained by the reaction of epoxy-functional polysiloxanes of the general formula

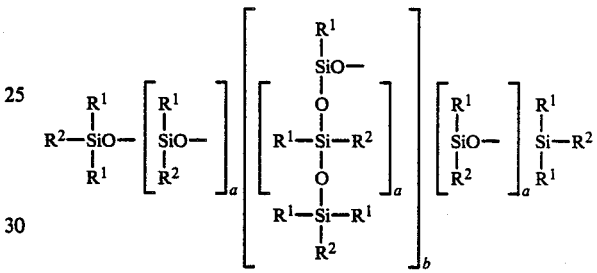

in which
$R^1$ are the same or different low molecular weight alkyl groups with 1 to 4 carbon atoms or phenyl groups,
$R^2$ is the same as $R^1$ or represents the $R^3$ group, 70 to 100% of the $R^3$ groups being epoxy functional groups and 30 to 0% being alkyl groups with 2 to 20 carbon atoms or hydrogen, with the proviso that the average molecule contains at least 1.5 epoxy groups,
a has a value of 1 to 1,000 and
b a value of 0 to 10,
with such amounts of an acid mixture, consisting of
(a) 10 to 90 mole percent of (meth)acrylic anhydride, and
(b) 90 to 10 mole percent of (meth)acrylic acid
that the sum of (a) and (b) adds up to 100 mole percent, and that there are present 0.8 to 1.9 acid equivalents per epoxide equivalents.

2. The polysiloxanes as claimed in claim 1, wherein said reaction is carried out at elevated temperatures.

3. The polysiloxanes as claimed in claim 1 or 2, wherein said reaction is carried out in the presence of solvents and esterification catalysts.

4. The polysiloxanes of claim 1, wherein 5 to 15% of the $R^3$ groups are alkyl groups with 2 to 20 carbon atoms.

5. The polysiloxanes of claim 1 or 4, wherein the reaction is carried out with such amounts of the acid mixture that there are present 1.1 to 1.9 acid equivalents per epoxide equivalents.

6. The polysiloxanes of claim 1 or 4, in which a has a value of 5 to 200 and b a value of 0 to 2.

7. The polysiloxanes of claim 5, in which a has a value of 5 to 200 and b a value of 0 to 2.

8. The polysiloxanes of claim 1 or 4, in which b has a value of 0.

9. The polysiloxanes of claim 5, in which b has a value of 0.

10. The polysiloxanes of claim 1, in which at least 90% of the $R^1$ groups are methyl groups.

11. The polysiloxanes of claim 1, wherein the epoxy-functional $R^3$ group is selected from the group consisting of

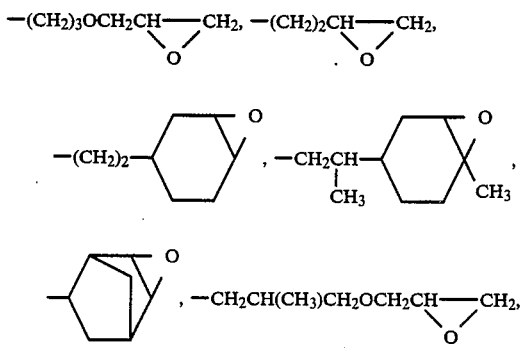

-continued

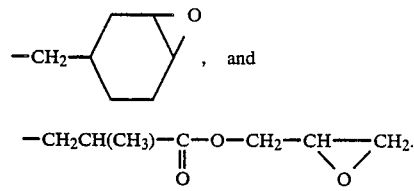

12. The polysiloxanes of claim 1, wherein $R^3$ is selected from the group consisting of ethyl, propyl, n-butyl, i-butyl, hexyl, octyl, dodecyl, octadecyl, 2-phenylpropyl and 3-chloropropyl.

13. The polysiloxanes of claim 2, wherein said elevated temperature is between about 80° to 150° C.

14. A radiation-curable adhesive coating composition essentially consisting of a polysiloxane of claim 1 and about 2 to 5 percent by weight of a photoinitiator.

15. A substrate having a surface coating, said surface coating comprising a radiation-cured polysiloxane of claim 1.

16. A substrate as claimed in claim 15, wherein the substrate is paper.

* * * * *